United States Patent
Tomita et al.

(10) Patent No.: US 10,160,420 B2
(45) Date of Patent: *Dec. 25, 2018

(54) VEHICLE CONTROL APPARATUS

(71) Applicants: Yosuke Tomita, Aichi (JP); Naoyuki Ishihara, Aichi (JP); Tetsuo Nishidai, Aichi (JP); Takahiro Inaguma, Aichi (JP); Kazuya Hamada, Aichi (JP)

(72) Inventors: Yosuke Tomita, Aichi (JP); Naoyuki Ishihara, Aichi (JP); Tetsuo Nishidai, Aichi (JP); Takahiro Inaguma, Aichi (JP); Kazuya Hamada, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 217 days.

This patent is subject to a terminal disclaimer.

(21) Appl. No.: 15/066,010

(22) Filed: Mar. 10, 2016

(65) Prior Publication Data
US 2016/0304053 A1    Oct. 20, 2016

(30) Foreign Application Priority Data

Apr. 15, 2015  (JP) ................................ 2015-082949

(51) Int. Cl.
*B60R 25/24*       (2013.01)
*B60R 25/20*       (2013.01)

(52) U.S. Cl.
CPC ........ *B60R 25/241* (2013.01); *B60R 25/2081* (2013.01)

(58) Field of Classification Search
CPC .... B60R 25/2081; B60R 25/241; B60R 25/24
(Continued)

(56) References Cited

U.S. PATENT DOCUMENTS 4,719,460 A * 1/1988 Takeuchi ............... B60R 25/24
                                                   180/287
5,552,641 A * 9/1996 Fischer .................. B60R 25/04
                                                   180/287
(Continued)

FOREIGN PATENT DOCUMENTS

JP       H11-74802 A      3/1999
JP       2001-098810 A    4/2001
(Continued)

OTHER PUBLICATIONS

Office Action issued in corresponding Japanese Application No. 2015-082949, dated Nov. 2, 2017 (8 pages).

*Primary Examiner* — Angelina Shudy
(74) *Attorney, Agent, or Firm* — Osha Liang LLP

(57) ABSTRACT

A vehicle control apparatus includes: a vehicle-mounted transmitter which transmits a first response request signal; a vehicle-mounted receiver which receives, from a portable device, a response signal to the first response request signal; and a controller which allows an operation for welcoming a user carrying the portable device to a vehicle according to a reception state of the response signal. When intermittently transmitting the first response request signal at predetermined intervals via the vehicle-mounted transmitter, the controller determines whether condition set in advance is established. When the condition is established, the controller transmits a second response request signal different from the first response request signal. When the vehicle-mounted receiver receives a response signal which is transmitted from the portable device as a response to the second response request signal, the controller continues to transmit the second response request signal via the vehicle-mounted transmitter.

8 Claims, 10 Drawing Sheets

(58) Field of Classification Search
USPC .......................................................... 701/36
See application file for complete search history.

(56) References Cited

U.S. PATENT DOCUMENTS

| | | | | |
|---|---|---|---|---|
| 5,734,330 | A * | 3/1998 | Nakamura | B60R 25/04 307/10.2 |
| 5,835,022 | A * | 11/1998 | Amano | B60N 2/0232 340/5.64 |
| 6,101,428 | A * | 8/2000 | Snyder | B60R 25/245 340/425.5 |
| 6,396,412 | B1 * | 5/2002 | Banas | B60R 25/246 340/426.35 |
| 6,570,486 | B1 * | 5/2003 | Simon | B60R 25/04 307/10.2 |
| 6,670,883 | B1 | 12/2003 | Asakura et al. | |
| 7,034,657 | B2 * | 4/2006 | Ueda | E05B 85/01 340/5.62 |
| 7,061,397 | B2 * | 6/2006 | Haselsteiner | B60R 25/24 340/426.15 |
| 7,439,849 | B2 * | 10/2008 | Kameyama | B60Q 1/50 340/425.5 |
| 7,515,048 | B1 * | 4/2009 | Bhattiprolu | G07C 9/00309 340/5.64 |
| 7,610,129 | B2 * | 10/2009 | Matsuura | B60R 25/209 340/425.5 |
| 7,629,876 | B2 * | 12/2009 | Nagai | B60R 25/24 340/426.13 |
| 7,778,743 | B2 * | 8/2010 | Arie | B60R 25/246 307/10.7 |
| 7,898,386 | B2 * | 3/2011 | Wisnia | B60R 25/209 340/5.62 |
| 7,978,049 | B2 * | 7/2011 | Leitch | B60R 25/24 340/5.72 |
| 7,999,655 | B2 * | 8/2011 | Yoshikawa | B60R 25/04 340/5.72 |
| 8,077,011 | B2 * | 12/2011 | McBride | B60R 25/245 340/10.1 |
| 8,401,578 | B2 * | 3/2013 | Inselberg | H04M 1/72577 340/904 |
| 8,427,276 | B2 * | 4/2013 | McBride | B60R 25/245 340/5.64 |
| 8,571,738 | B1 * | 10/2013 | Potter | B60L 3/0046 324/434 |
| 8,736,420 | B2 * | 5/2014 | Aaron | G06F 3/014 340/5.64 |
| 8,922,356 | B2 * | 12/2014 | Lambert | G07C 5/008 340/426.1 |
| 9,008,861 | B2 * | 4/2015 | Saiki | B60R 25/2072 701/2 |
| 9,126,564 | B2 * | 9/2015 | Ono | B60R 25/24 |
| 9,352,723 | B2 * | 5/2016 | Yamamoto | B60R 25/04 |
| 9,432,953 | B2 * | 8/2016 | Nishiguchi | H04W 52/283 |
| 9,646,443 | B2 * | 5/2017 | Hamada | G07C 9/00309 |
| 9,710,985 | B2 * | 7/2017 | Tomita | G07C 9/00309 |
| 9,805,532 | B2 * | 10/2017 | Hamada | G07C 9/00309 |
| 9,867,008 | B2 * | 1/2018 | Nishidai | H04W 76/30 |
| 9,963,108 | B2 * | 5/2018 | Nishidai | B60R 16/037 |
| 2001/0054952 | A1 * | 12/2001 | Desai | E05B 77/48 340/5.72 |
| 2004/0046451 | A1 * | 3/2004 | Shibagaki | B60R 25/24 307/10.2 |
| 2004/0073340 | A1 * | 4/2004 | Ueda | G07C 9/00309 701/2 |
| 2005/0024181 | A1 * | 2/2005 | Hofbeck | B60R 25/02 340/5.7 |
| 2005/0083174 | A1 * | 4/2005 | Nakamura | B60R 25/246 340/5.72 |
| 2005/0168322 | A1 * | 8/2005 | Appenrodt | B60R 25/246 340/5.72 |
| 2005/0275511 | A1 * | 12/2005 | Luo | B60R 25/00 340/426.17 |
| 2006/0091997 | A1 * | 5/2006 | Conner | B60R 25/1003 340/5.64 |
| 2006/0273888 | A1 * | 12/2006 | Yamamoto | B60R 25/24 340/426.36 |
| 2007/0046232 | A1 * | 3/2007 | Mullet | G07C 9/00309 318/280 |
| 2008/0061931 | A1 * | 3/2008 | Hermann | B60R 25/24 340/5.72 |
| 2009/0009303 | A1 * | 1/2009 | Fujioka | B60C 23/0408 340/426.36 |
| 2010/0148721 | A1 * | 6/2010 | Little | G06F 21/31 320/106 |
| 2011/0257817 | A1 * | 10/2011 | Tieman | B60R 25/24 701/2 |
| 2012/0092129 | A1 * | 4/2012 | Lickfelt | B60R 25/24 340/5.72 |
| 2012/0179306 | A1 * | 7/2012 | Saiki | B60R 25/2072 701/2 |
| 2012/0244877 | A1 * | 9/2012 | Margalef | G01S 5/0252 455/456.1 |
| 2014/0045531 | A1 * | 2/2014 | Kessoku | H04W 4/046 455/456.2 |
| 2014/0203907 | A1 * | 7/2014 | Ohata | G07C 9/00309 340/5.61 |
| 2014/0297154 | A1 * | 10/2014 | Yamamoto | B60R 25/04 701/99 |
| 2015/0048927 | A1 * | 2/2015 | Simmons | G07C 9/00309 340/5.61 |
| 2015/0246657 | A1 * | 9/2015 | Tomita | F02N 11/0807 701/2 |
| 2015/0247481 | A1 * | 9/2015 | Tomita | F02N 11/0807 701/2 |
| 2015/0261304 | A1 * | 9/2015 | Kamisawa | G07C 9/00174 340/5.28 |
| 2015/0281423 | A1 * | 10/2015 | Tomita | H04W 4/80 455/420 |
| 2016/0117877 | A1 * | 4/2016 | Hamada | G07C 9/00309 340/5.61 |
| 2016/0202697 | A1 * | 7/2016 | Matsumoto | B60R 25/245 701/2 |
| 2016/0267734 | A1 * | 9/2016 | Hamada | G07C 9/00309 |
| 2016/0267735 | A1 * | 9/2016 | Hamada | G07C 9/00309 |
| 2016/0275732 | A1 * | 9/2016 | Tomita | G07C 9/00309 |
| 2017/0008488 | A1 * | 1/2017 | Matsumoto | H04W 12/06 |
| 2017/0151928 | A1 * | 6/2017 | Kang | B60R 25/04 |
| 2017/0232933 | A1 * | 8/2017 | Nishidai | B60R 16/037 340/5.61 |
| 2017/0251335 | A1 * | 8/2017 | Nishidai | H04W 76/30 |
| 2017/0253216 | A1 * | 9/2017 | Nishidai | B60R 25/01 |

FOREIGN PATENT DOCUMENTS

| | | |
|---|---|---|
| JP | 2005-127050 A | 5/2005 |
| JP | 2006-070624 A | 3/2006 |
| JP | 2008-038514 A | 2/2008 |
| JP | 2010-031589 A | 2/2010 |
| JP | 2011-223499 A | 11/2011 |
| JP | 2012-017558 A | 1/2012 |
| JP | 2015-021249 A | 2/2015 |

* cited by examiner

WELCOME SYSTEM 100

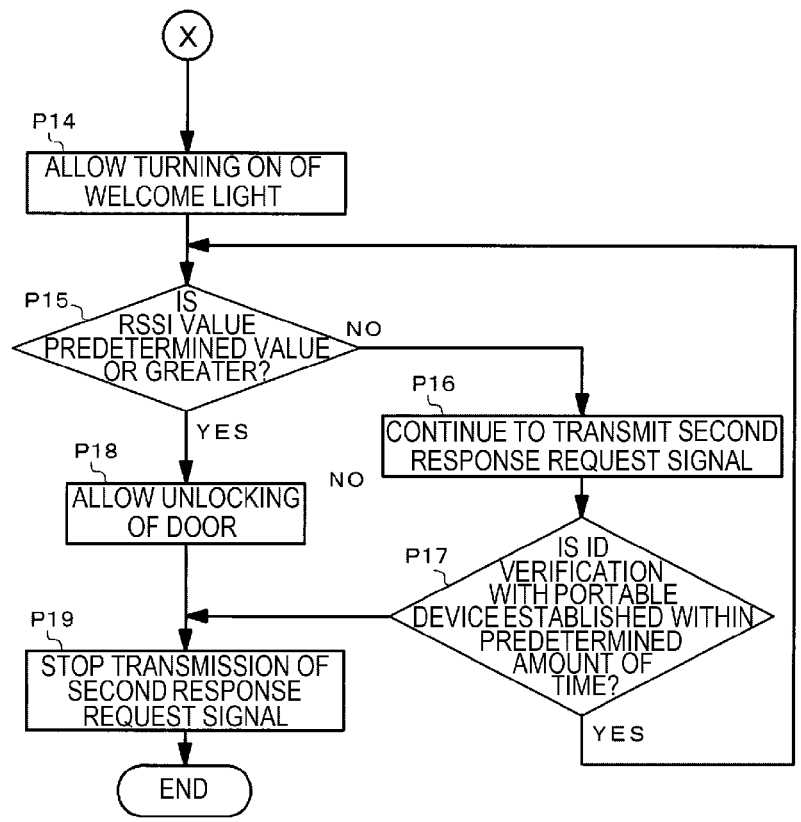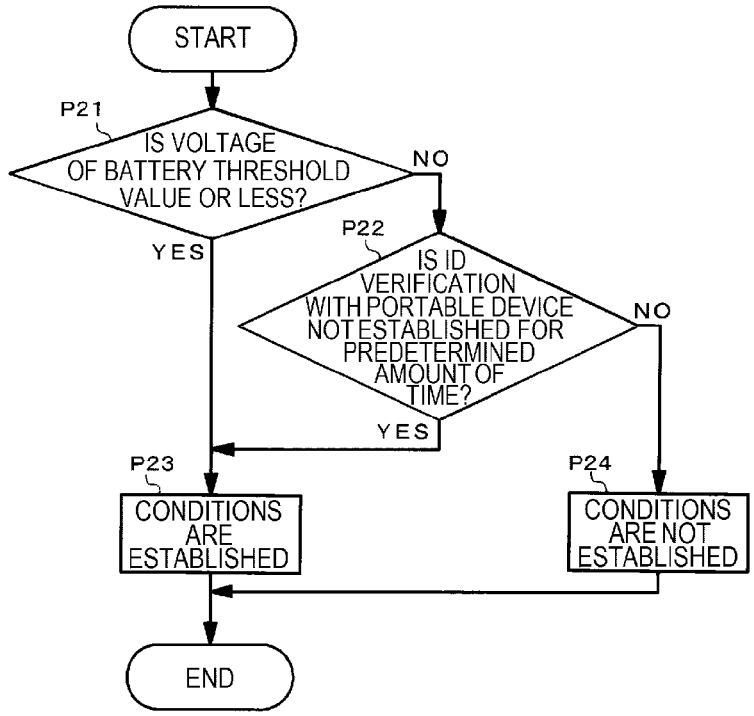

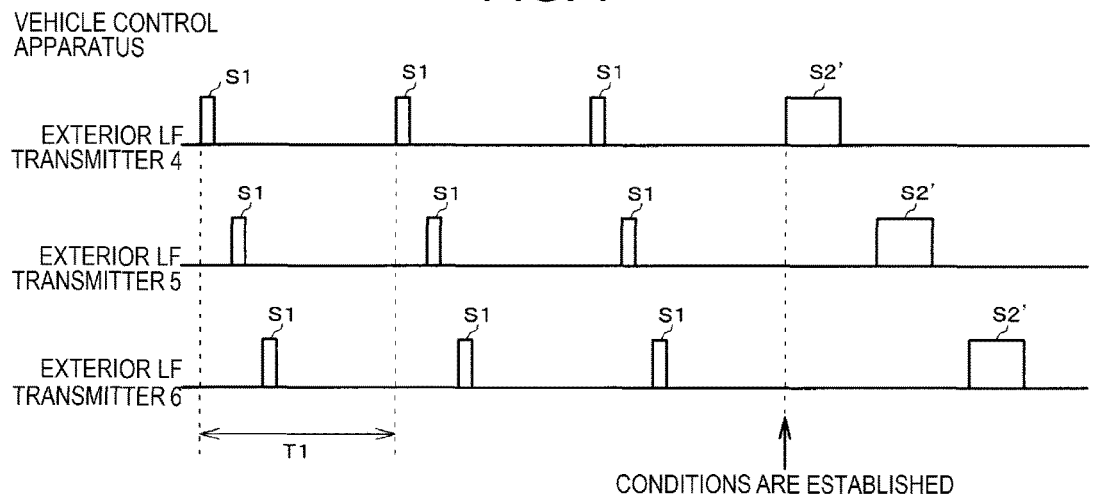
FIG. 7
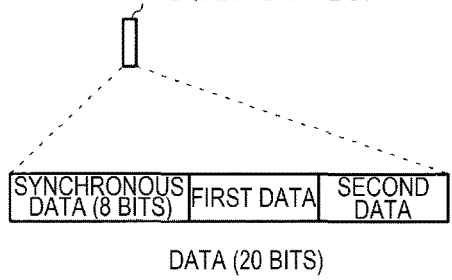
FIG. 8
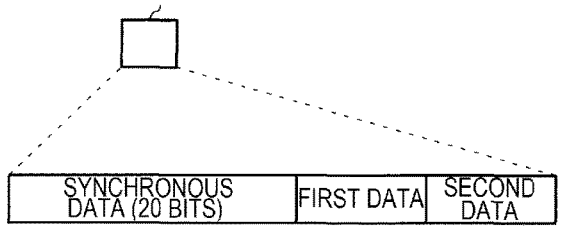

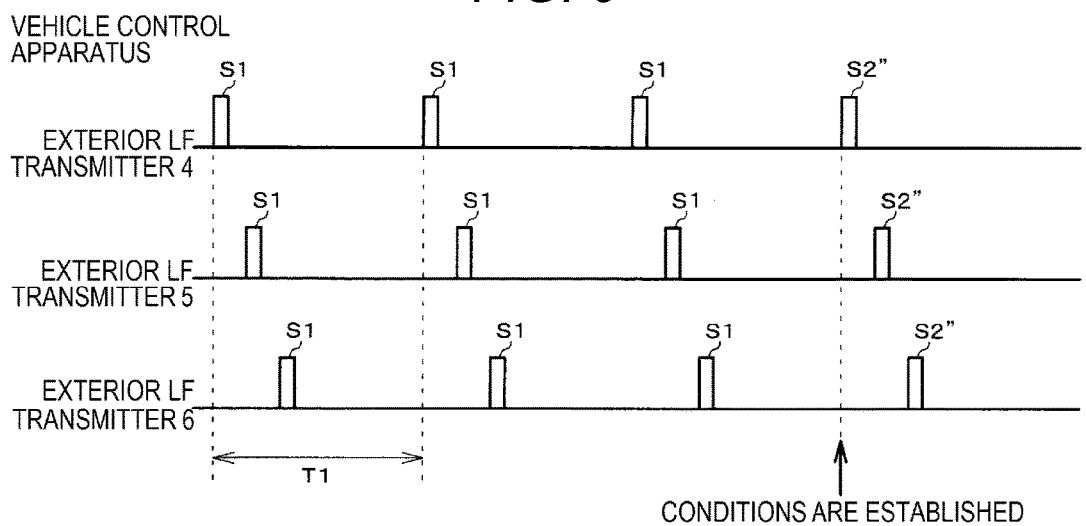
FIG. 9
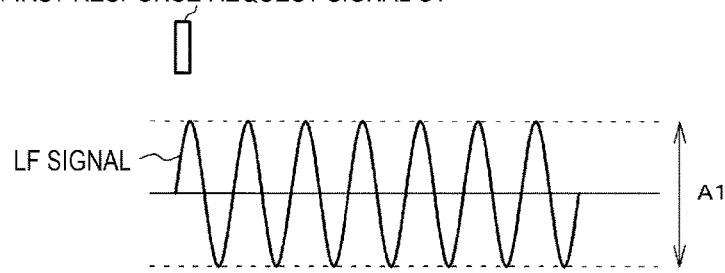
FIG. 10
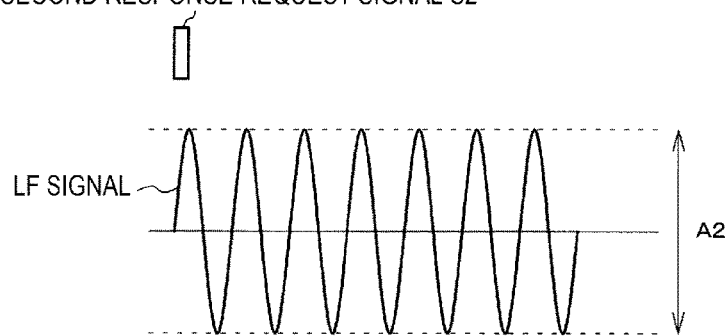

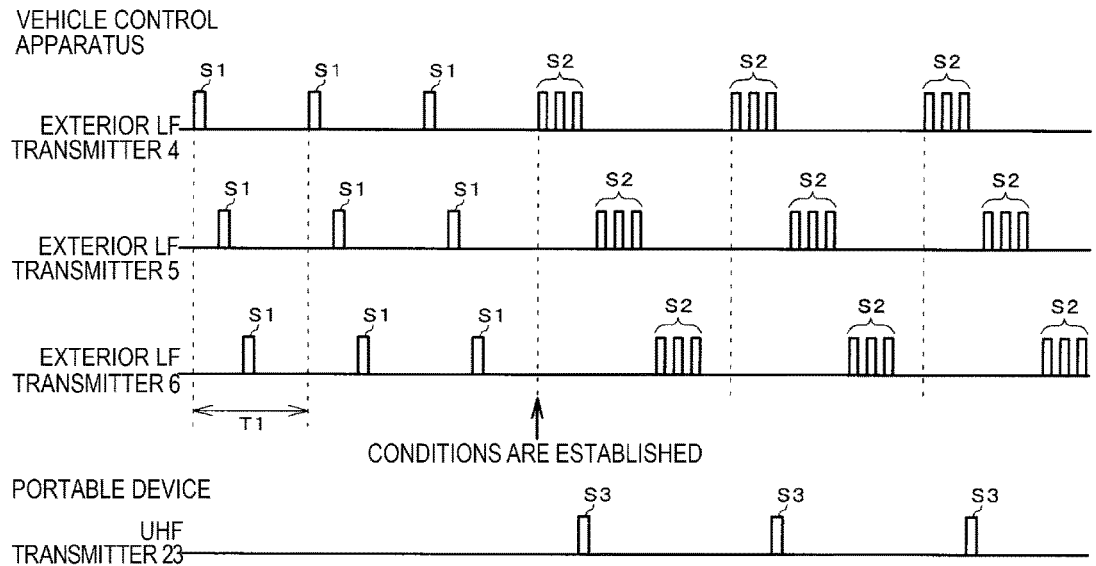
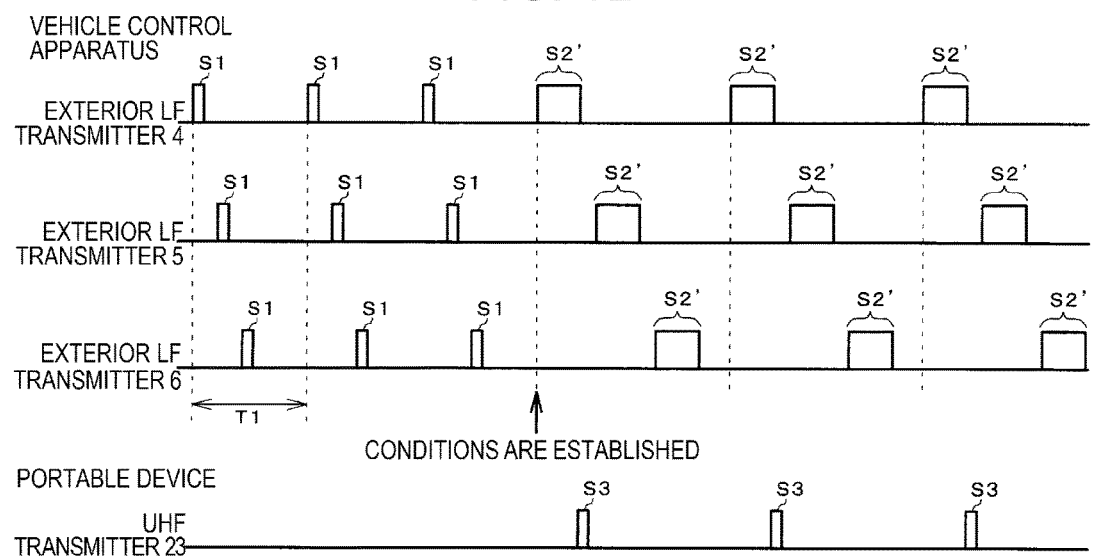

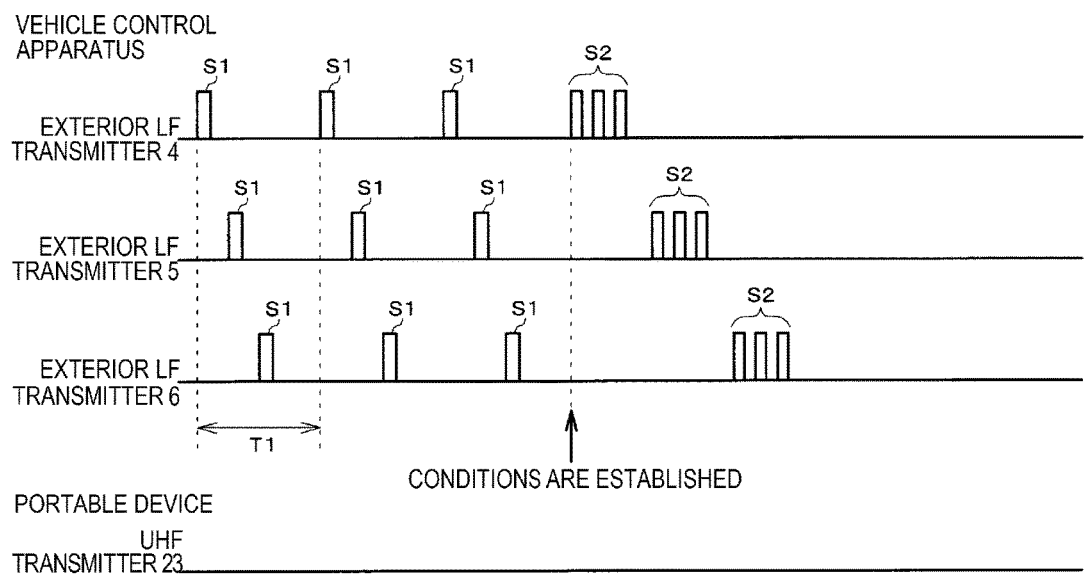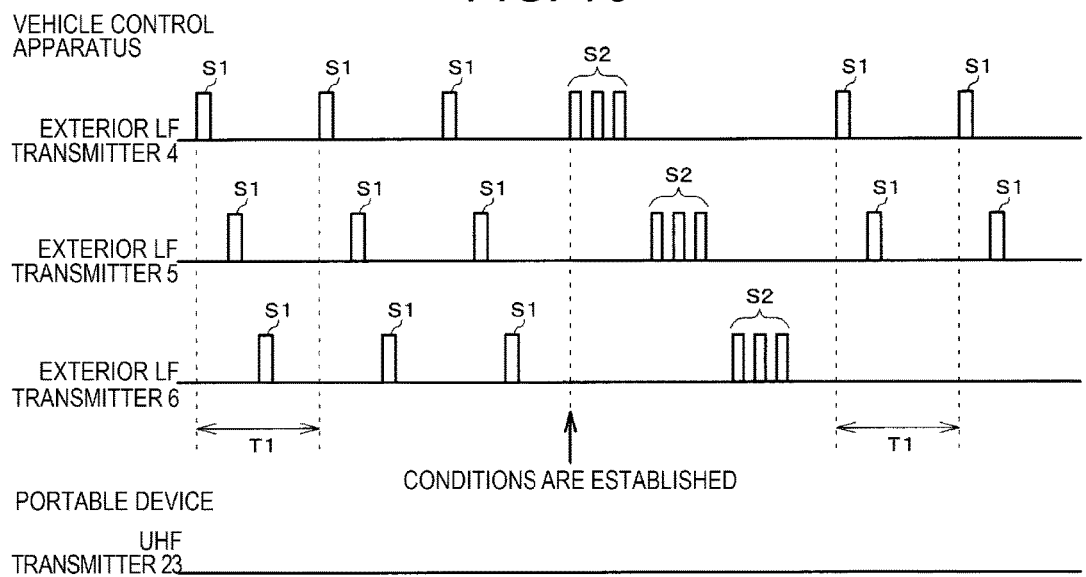

VEHICLE CONTROL APPARATUS

CROSS-REFERENCES TO RELATED APPLICATIONS

This application is based upon and claims the benefit of priority from Japanese Patent Application No. 2015-082949, filed on Apr. 15, 2015; the entire contents of which are incorporated herein by reference.

FIELD

One or more embodiments of the present invention relate to a vehicle control apparatus configured to detect that a user carrying a portable device has approached a vehicle, and to allow the operation of a vehicle-mounted apparatus to welcome the user to the vehicle.

BACKGROUND

As disclosed in JP-A-2005-127050, a vehicle may have a welcome function in which it is detected that a user carrying a portable device has approached the vehicle, and a vehicle-mounted apparatus is operated to welcome the user to the vehicle. For example, the welcome function is realized by use of a keyless entry system or a passive entry system.

Specifically, a vehicle-mounted transmitter mounted in the vehicle intermittently transmits a response request signal at predetermined intervals. When a user carrying a portable device approaches the vehicle, the portable device receives the response request signal, and responds with a response signal. When the vehicle-mounted transmitter mounted in the vehicle receives the response signal, for example, a welcome light provided in a side view mirror is turned on to illuminate the ground in the vicinity of a door, and welcomes the user to the vehicle.

The transmission of a response request signal from the vehicle-mounted transmitter is performed by a polling method. For this reason, when the amount of stop time of an engine of the vehicle is increased, and the vehicle-mounted transmitter intermittently transmits a response request signal, electrical power is continuously consumed, and a battery of the vehicle, which is a power supply, is discharged, which is a problem. In the system disclosed in JP-A-2001-098810, when the voltage of a battery is decreased to be lower than the voltage required to guarantee the driving of a door lock mechanism, or when a function stop switch provided in a portable device or a vehicle is operated, the transmission of a response request signal from a vehicle-mounted transmitter is stopped.

As described in JP-A-2008-038514, multiple vehicle-mounted transmitters may be respectively provided for seats of a vehicle. In the system disclosed in JP-A-2008-038514, in order to efficiently search for a portable device, response request signals are efficiently transmitted according to an intermittent output control pattern in which the amount of time, for which two or more (but less than the total number of vehicle-mounted transmitters) of the vehicle-mounted transmitters transmit response request signals at the same time, is determined.

A transmission output level is required to be adjusted such that the field strength of a response request signal transmitted from a vehicle-mounted transmitter does not exceed a specified value specified in the Radio Law at any position in the vicinity of a vehicle. In the system disclosed in JP-A-H11-074802, a receiver measures the received field strength of radio waves transmitted from a transmitter, and a correction value for a transmission output level is calculated by comparing the measured value with a reference value stored in advance. The transmission output level is changed based on the correction value, and a transmitter transmits radio waves based on the changed transmission output level.

In contrast, JP-A-2015-021249 discloses a remote operation system which detects a specified operation performed by a user via a portable device (electronic key), and allows or executes the remote operation of a vehicle-mounted apparatus when the operation is determined to be valid. In the system disclosed in JP-A-2015-021249, the portable device determines the validity of the specified operation performed by the user, based on a detection value from an acceleration sensor. In a case where the amount of change between received signal strength when a remote operation is started and received signal strength when the remote operation is ended is calculated, and in a case where the amount of change is a threshold value or less, it is determined that a user performs the remote operation, and thus, the portable device allows the remote operation. When a vehicle-side apparatus receives a notification for the start of an operation from the portable device, the vehicle-side apparatus further shortens the poling period of radio waves transmitted from a vehicle-mounted transmitter compared to that of a normal period. When a predetermined amount of time has elapsed, or when the vehicle-mounted apparatus receives a notification for the end of the operation or the stop of the operation from the portable device, the vehicle-mounted apparatus returns the poling period to the original value.

SUMMARY

For example, in a case where a lot of noise is present in the vicinity of a vehicle, even if a user carrying a portable device approaches the vehicle, the portable device may not be able to receive the response request signal transmitted from the vehicle-mounted transmitter. In this case, since the portable device does not respond with a response signal, the vehicle is not capable of detecting the approach of the user, and the operation of a vehicle-mounted apparatus to welcome the user is not allowed.

In order for the user to easily get in the vehicle, continuous communication between the portable device and the vehicle-side apparatus is required to continuously operate the vehicle-mounted welcome apparatus or to operate another vehicle-mounted apparatus.

An object of one or more embodiments of the invention is to provide a vehicle control apparatus in which reliability of communication with a portable device can be improved.

According to an aspect of the invention, there is provided a vehicle control apparatus including: a vehicle-mounted transmitter which transmits a first response request signal; a vehicle-mounted receiver which receives a response signal which is transmitted from a portable device as a response to the first response request signal; and a controller which controls the vehicle-mounted transmitter and the vehicle-mounted receiver, and which allows an operation of a vehicle-mounted apparatus for welcoming a user carrying the portable device to a vehicle according to a reception state of the response signal received via the vehicle-mounted receiver. When the controller intermittently transmits the first response request signal at predetermined intervals via the vehicle-mounted transmitter, the controller determines whether or not condition set in advance is established. When the condition is established, the controller transmits a second response request signal, which is different from the first response request signal, via the vehicle-mounted transmitter instead of transmitting the first response request signal. When the vehicle-mounted receiver receives a response signal which is transmitted from the portable device as a response to the second response request signal, the controller continues to transmit the second response request signal via the vehicle-mounted transmitter.

In this configuration, when the user carrying the portable device approaches the vehicle, in a case where the portable device may not be able to receive the first response request signal transmitted from the vehicle-mounted transmitter due to a lot of noise in the vicinity of the vehicle, but the condition set in advance is established, the vehicle-mounted transmitter transmits the second response request signal different from the first response request signal. For this reason, communication between the vehicle control apparatus and the portable device is enabled such that the portable device receives the second response request signal, and the vehicle-mounted receiver receives the response signal which is transmitted from the portable device as a response. As a result, the vehicle control apparatus is capable of easily detecting the approach of the user. When the vehicle-mounted receiver receives the response signal which is transmitted from the portable device as a response to the second response request signal, the vehicle-mounted transmitter continues to transmit the second response request signal. For this reason, even if a lot of noise is present in the vicinity of the vehicle, continuous communication between the vehicle control apparatus and the portable device can be stably performed. Accordingly, reliability of the communication between the vehicle control apparatus and the portable device can be improved.

In the vehicle control apparatus according to the aspect of the invention, in a case where the vehicle-mounted receiver receives the response signal which is transmitted from the portable device as the response to the second response request signal, and verification of an ID code included in the response signal is established, the controller may continue to transmit the second response request signal via the vehicle-mounted transmitter.

In the vehicle control apparatus according to the aspect of the invention, in a case where the vehicle-mounted receiver receives the response signal which is transmitted from the portable device as the response to the second response request signal, and the verification of the ID code included in the response signal is established, the controller may allow the operation of the vehicle-mounted apparatus to welcome a user.

According to the aspect of the invention, the portable device may detect received signal strength of the received second response request signal, and transmit the response signal including the received signal strength. In a case where the vehicle-mounted receiver receives the response signal which is transmitted from the portable device as the response to the second response request signal, and the received signal strength included in the response signal is less than a predetermined value, the controller may continue to transmit the second response request signal via the vehicle-mounted transmitter.

In the aspect of the invention, preferably, the second response request signal is a signal which is received by the portable device more easily than the first response request signal. For example, the second response request signal may be a signal having a transmission pattern, a data format, or signal strength different from that of the first response request signal. In other words, the second response request signal may be a signal having a shorter transmission interval, a longer data length, or stronger signal strength than that of the first response request signal.

In the aspect of the invention, the condition may include a condition that voltage of a battery, which is a power supply of the vehicle, is a threshold value or less. The condition may include a condition that communication with the portable device or verification of an ID code with the portable device is not established for a predetermined amount of time.

In the vehicle control apparatus according to the aspect of the invention, in a case where the condition is not established, in a case where the vehicle-mounted receiver does not receive the response signal which is transmitted from the portable device as the response to the second response request signal, or in a case where the vehicle-mounted receiver receives the response signal which is transmitted from the portable device as the response to the second response request signal, but verification of an ID code included in the response signal is not established, the controller may transmit the first response request signal again via the vehicle-mounted transmitter.

According to one or more embodiments of the invention, it is possible to provide a vehicle control apparatus in which reliability of communication with a portable device can be improved.

BRIEF DESCRIPTION OF THE DRAWINGS

FIG. 3B is a flowchart illustrating steps subsequent to the steps in FIG. 3A.

FIG. 4 is a flowchart illustrating a condition confirmation process in FIG. 3A in detail.

FIG. 7 is a chart illustrating another example of a transmission pattern of the first response request signal and the second response request signal from the exterior LF transmitter in FIG. 1.

FIG. 8 is a chart illustrating an example of data formats of the first response request signal and the second response request signal in the example illustrated in FIG. 7.

FIG. 9 is a chart illustrating still another example of a transmission pattern of the first response request signal and the second response request signal from the exterior LF transmitter in FIG. 1.

FIG. 10 is a graph illustrating an example of the strengths of the first response request signal and the second response request signal in the example illustrated in FIG. 9.

FIG. 11 is a chart illustrating an example of a transmission pattern of the first response request signal, the second response request signal, and a response signal in a case where the vehicle control apparatus in FIG. 1 receives the response signal corresponding to the second response request signal.

FIG. 12 is a chart illustrating another example of a transmission pattern of the first response request signal, the second response request signal, and a response signal in a case where the vehicle control apparatus in FIG. 1 receives the response signal corresponding to the second response request signal.

FIG. 15 is a chart illustrating another example of a transmission pattern of the first response request signal and the second response request signal in a case where the vehicle control apparatus in FIG. 1 does not receive a response signal corresponding to the second response request signal.

FIG. 16 is a chart illustrating another example of a transmission pattern of the first response request signal and the second response request signal in a case where the vehicle control apparatus in FIG. 1 does not receive a response signal corresponding to the second response request signal.

DETAILED DESCRIPTION

Figure 1:
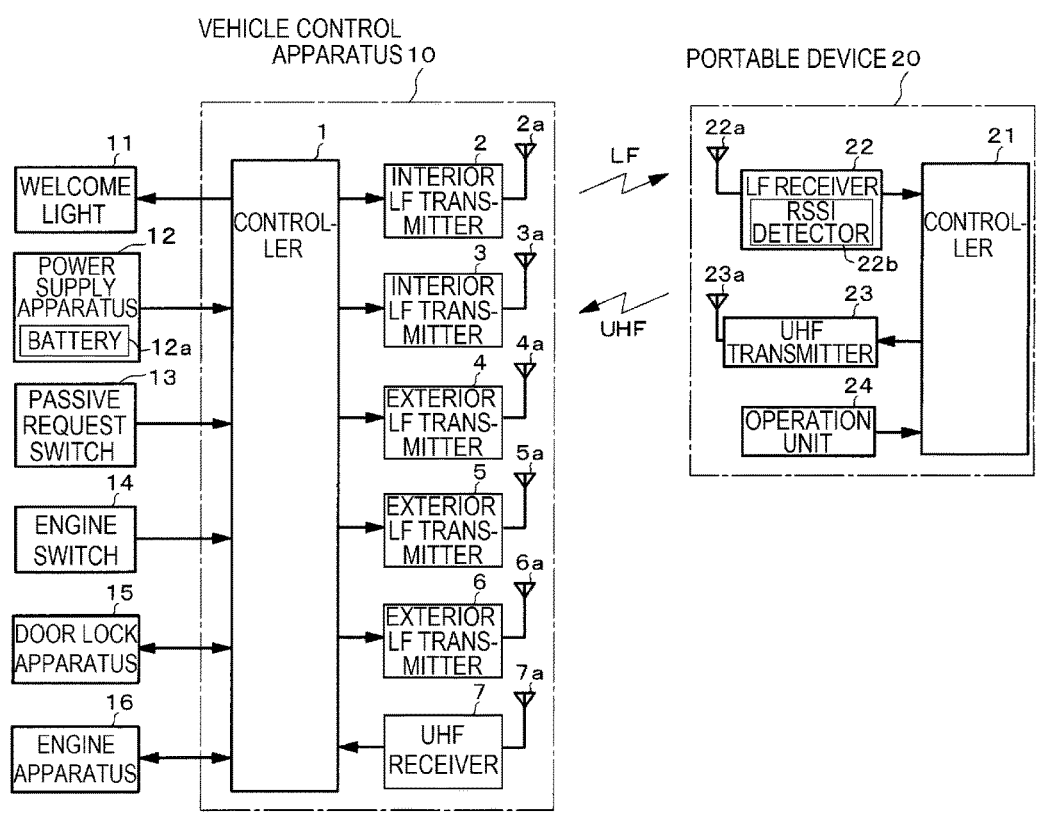
FIG. 1 is a block diagram illustrating the configuration of a welcome system.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments in the invention will be described with reference to the accompanying drawings. In the drawings, the same reference signs will be assigned to the same portions or the corresponding portions.

First, the configuration of the embodiments will be described with reference to FIGS. 1 and 2.

FIG. 1 is a block diagram illustrating the configuration of a welcome system 100. FIG. 2 is a view illustrating a vehicle 30 in which the welcome system 100 is mounted.

The welcome system 100 detects that a user carrying a portable device 20 has approached the vehicle 30 (refer to FIG. 2), and operates a vehicle-mounted apparatus to welcome the user to the vehicle 30. In this example, a welcome light 11 and a door lock apparatus 15 (refer to FIG. 1) are used as vehicle-mounted apparatuses welcoming a user to the vehicle 30.

The system 100 in FIG. 1 is a keyless entry system that locks and unlocks doors 31 to 33 via a switch operation in a state where the portable device 20 is in proximity to the vehicle 30, or a passive entry system that locks and unlocks the doors 31 to 33 when a user approaches or comes into contact with a door knob.

The vehicle control apparatus 10, the welcome light 11, a power supply apparatus 12, a passive request switch 13, an engine switch 14, the door lock apparatus 15, and an engine apparatus 16 are mounted in the vehicle 30. The portable device 20 is carried by a user of the vehicle 30.

The vehicle control apparatus 10 includes a controller 1; interior low frequency (LF) transmitters 2 and 3; exterior LF transmitters 4 to 6; and an ultra high frequency (UHF) receiver 7. The controller 1 is configured to include a CPU, a memory, and the like.

The interior LF transmitters 2 and 3 and the exterior LF transmitters 4 to 6 are configured to respectively include LF signal transmission circuits and antennas 2a to 6a. The respective antennas 2a and 3a of the interior LF transmitters 2 and 3 are provided in the vehicle interior of the vehicle 30 illustrated in FIG. 2. The interior LF transmitters 2 and 3 in the vehicle interior transmit LF signals so as to communicate with the portable device 20.

Figure 2:
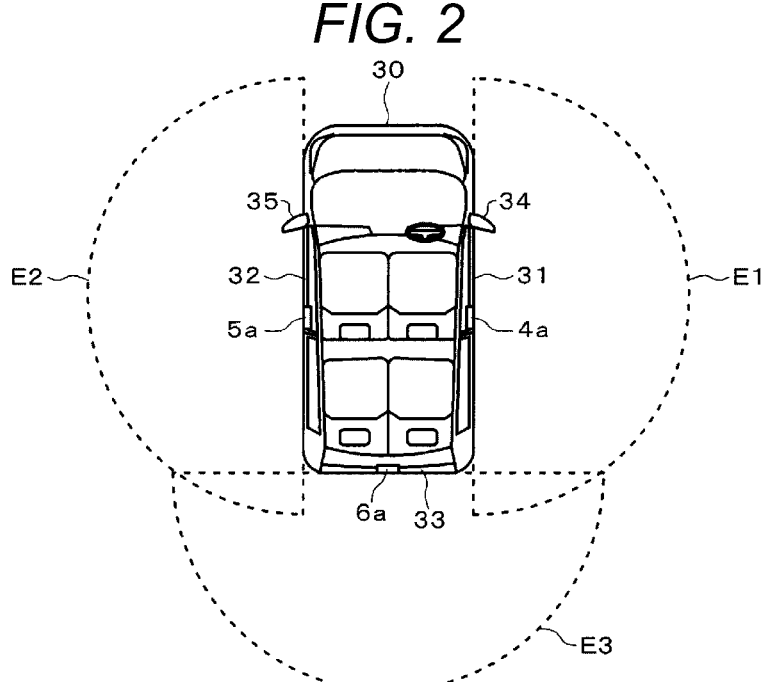
FIG. 2 is a view illustrating a vehicle in which the welcome system in FIG. 1 is mounted.

As illustrated in FIG. 2, the respective antennas 4a to 6a of the exterior LF transmitters 4 to 6 are provided on the vehicle exterior of the vehicle 30. Specifically, the antenna 4a of the exterior LF transmitter 4 is provided in the outside vicinity of the door 31 of a driver's seat of the vehicle 30. The antenna 5a of the exterior LF transmitter 5 is provided in the outside vicinity of the door 32 of a front passenger's seat of the vehicle 30. The antenna 6a of the exterior LF transmitter 6 is provided in the outside vicinity of the back door 33 of the vehicle 30. The exterior LF transmitters 4 to 6 transmit LF signals to the outside vicinity of the vehicle 30 in a polling method so as to communicate with the portable device 20. Each of the LF signals transmitted from the LF transmitters 2 to 6 includes a response request signal requesting the portable device 20 to transmit a response. The exterior LF transmitters 4 to 6 are examples of a "vehicle-mounted transmitter" of one or more embodiments of the invention.

The UHF receiver 7 is configured to include a UHF signal reception circuit and an antenna 7a. The UHF receiver 7 receives a UHF signal transmitted from the portable device 20. The UHF receiver 7 is an example of a "vehicle-mounted receiver" of one or more embodiments of the invention.

The controller 1 controls the LF transmitters 2 to 6 and the UHF receiver 7 such that the LF transmitters 2 to 6 and the UHF receiver 7 communicate with (transmit to and receive information from) the portable device 20.

The portable device 20 is formed of an FOB key, and includes a controller 21; an LF receiver 22; a UHF transmitter 23; and an operation unit 24. The controller 21 is configured to include a CPU, a memory, and the like.

The LF receiver 22 is configured to include an LF signal reception circuit, an antenna 22a, and an RSSI detector 22b. The LF receiver 22 receives LF signals transmitted from the LF transmitters 2 to 6 of the vehicle control apparatus 10. Each of the LF signals received by the LF receiver 22 includes the aforementioned response request signal. The RSSI detector 22b detects the RSSI value (received signal strength) of a response request signal received by the antenna 22a.

The UHF transmitter 23 is configured to include a UHF signal transmission circuit and an antenna 23a. The UHF transmitter 23 transmits a UHF signal to the vehicle control apparatus 10. The UHF signal transmitted from the UHF transmitter 23 includes a response signal which is transmitted to the vehicle control apparatus 10 in response to the fact that the LF receiver 22 has received the response request signal.

The operation unit 24 is configured to include switches operated to lock and unlock the doors 31 to 33. The controller 21 controls the LF receiver 22 and the UHF transmitter 23 such that the LF receiver 22 and the UHF transmitter 23 transmit to and receive signals or information from the vehicle control apparatus 10.

Welcome areas E1 to E3 illustrated in FIG. 2 are areas in which a user carrying the portable device 20 is welcomed to the vehicle 30. The vehicle control apparatus 10 is capable of communicating with the portable device 20 in any one of the welcome areas E1 to E3.

Specifically, the vehicle control apparatus 10 is capable of communicating with the portable device 20 in the welcome area E1 via the exterior LF transmitter 4 and the UHF receiver 7. The vehicle control apparatus 10 is capable of communicating with the portable device 20 in the welcome area E2 via the exterior LF transmitter 5 and the UHF receiver 7. The vehicle control apparatus 10 is capable of communicating with the portable device 20 in the welcome area E3 via the exterior LF transmitter 6 and the UHF receiver 7.

The vehicle control apparatus 10 communicates with the portable device 20, and ID codes are verified by both the vehicle control apparatus 10 and the portable device 20 in any one of the welcome areas E1 to E3. In a case where the verification is established, that is, in a case where both the ID codes are the same, the operation of a predetermined vehicle-mounted apparatus of the vehicle 30 is allowed.

As illustrated in FIG. 1, the vehicle control apparatus 10 is connected to vehicle-mounted apparatuses such as the welcome light 11, the power supply apparatus 12, the door lock apparatus 15, and the engine apparatus 16. The vehicle control apparatus 10 is connected to switches such as the passive request switch 13 and the engine switch 14.

The welcome light 11 is configured to include a light emitting diode and the like, and is installed in each of side view mirrors 34 and 35 (refer to FIG. 2) of the vehicle 30. The power supply apparatus 12 includes a battery 12a which is a power supply of the vehicle 30. The power supply apparatus 12 manages electrical power of the battery 12a, and, for example, transmits information indicating the voltage of the battery 12a to the controller 1 of the vehicle control apparatus 10.

The passive request switch 13 is installed in the vicinity of a door knob on an outer surface of each of the doors 31 to 33 (refer to FIG. 2) of the vehicle 30. The engine switch 14 is installed in the vicinity of the driver's seat in the vehicle interior of the vehicle 30.

The door lock apparatus 15 is configured to include mechanisms for respectively locking and unlocking the doors 31 to 33 of the vehicle 30, and a drive circuit of each of the mechanisms. The engine apparatus 16 is configured to include a starter motor for driving an engine of the vehicle 30, and a drive circuit of the starter motor.

When a user carrying the portable device 20 operates the passive request switch 13, an operation signal is input to the controller 1. At this time, the controller 1 communicates with the portable device 20 via the LF transmitters 2 to 6 and the UHF receiver 7, and verifies the ID code. When the verification is established, the controller 1 controls the door lock apparatus 15 such that each of the doors 31 to 33 of the vehicle 30 is locked and unlocked.

In a case where a user operates the operation unit 24 of the portable device 20 in any one of the welcome areas E1 to E3, the controller 21 transmits a signal corresponding to the operation via the UHF transmitter 23. When the vehicle control apparatus 10 receives the signal corresponding to the operation of the operation unit 24 via the UHF receiver 7, the controller 1 verifies the ID code. When the verification is established, the controller 1 controls the door lock apparatus 15 such that the doors 31 to 33 of the vehicle 30 are locked and unlocked.

When a user carrying the portable device 20 operates the engine switch 14, an operation signal is input to the controller 1. At this time, the controller 1 communicates with the portable device 20, and verifies the ID code. When the verification is established, the controller 1 controls the engine apparatus 16 such that the engine of the vehicle 30 is started or stopped.

Hereinafter, operations of the vehicle control apparatus 10 and the portable device 20 will be described with reference to FIGS. 3A to 16.

Figure 3A:
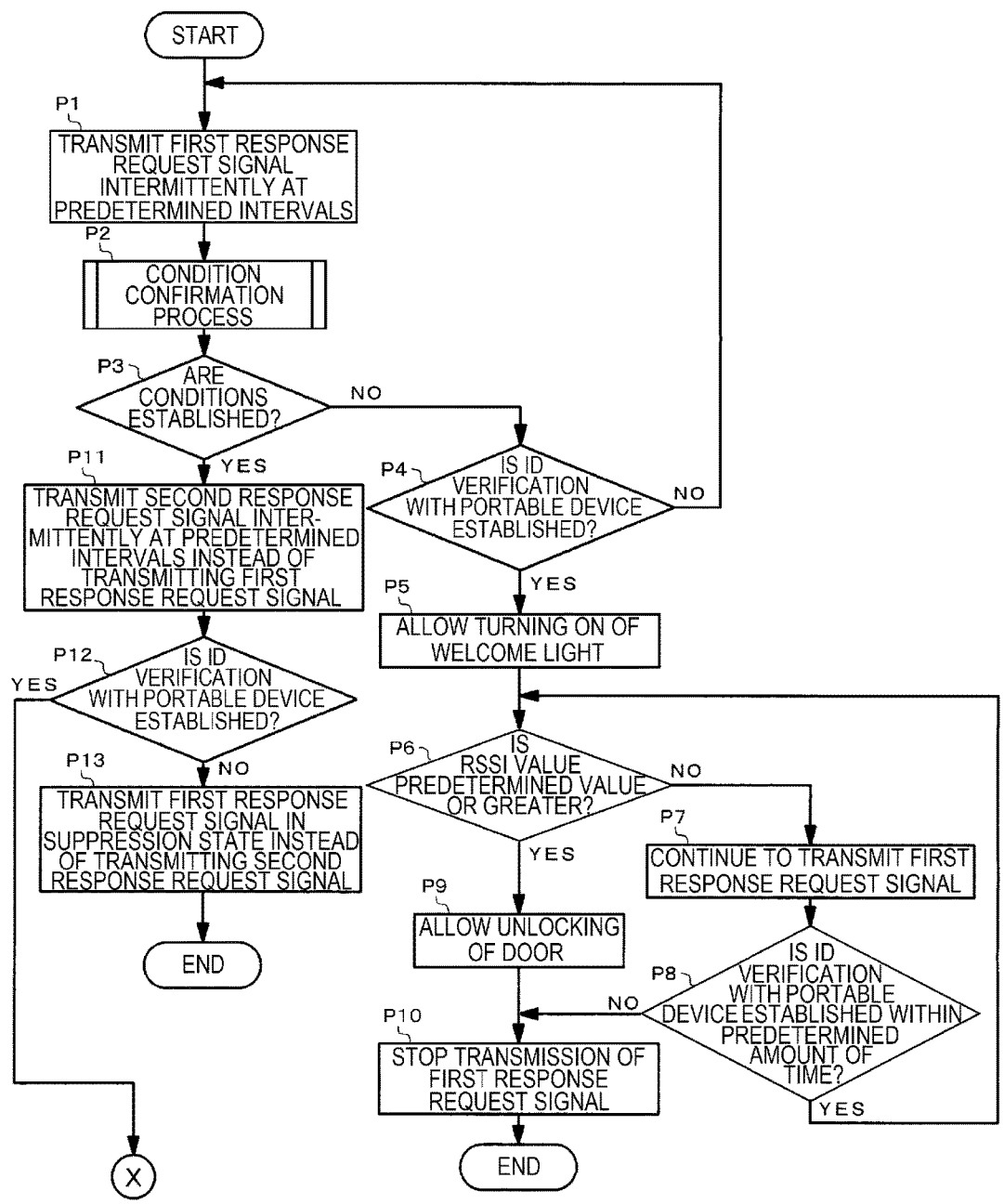
FIG. 3A is a flowchart illustrating the operation of a vehicle control apparatus in FIG. 1.

FIGS. 3A and 3B are flowcharts illustrating the operation of the vehicle control apparatus 10. For example, in a case where the vehicle 30 is stopped, and a user carrying the portable device 20 does not get in the vehicle 30, the controller 1 of the vehicle control apparatus 10 intermittently transmits first response request signals S1 at predetermined intervals via the exterior LF transmitters 4 to 6 (step P1 in FIG. 3A).

Figure 5:
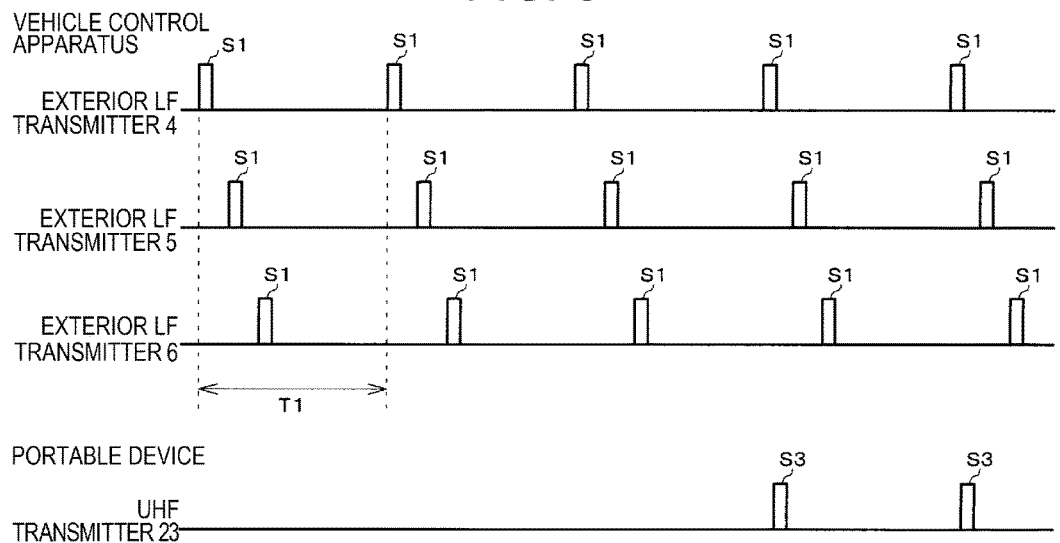
FIG. 5 is a chart illustrating an example of a transmission pattern of a first response request signal from an exterior LF transmitter and a response signal from a portable device in FIG. 1.

FIG. 5 is a chart illustrating an example of a transmission pattern of the first response request signals S1 from the exterior LF transmitters 4 to 6. For example, the exterior LF transmitter 4 transmits the first response request signal S1. After a predetermined interval has elapsed, the exterior LF transmitter 5 transmits the first response request signal S1. After a predetermined interval has elapsed, the exterior LF transmitter 6 transmits the first response request signal S1. The transmission interval between the exterior LF transmitter 4 and the exterior LF transmitter 5 may be the same as or different from the transmission interval between the exterior LF transmitter 5 and the exterior LF transmitter 6. The exterior LF transmitters 4 to 6 have the same signal transmission period T1.

The controller 1 executes a condition confirmation process while the first response request signals S1 are transmitted by the exterior LF transmitters 4 to 6 (step P2 in FIG. 3A).

FIG. 4 is a flowchart illustrating the condition confirmation process in detail. The condition confirmation process is a process of detecting whether or not conditions set in advance are established. The conditions include the condition that the voltage of the battery 12a is a threshold value or less (step P21 in FIG. 4), and also include the condition that it is determined that ID verification with the portable device 20 is not established for a predetermined amount of time (step P22 in FIG. 4).

Specifically, in step P21 illustrated in FIG. 4, the controller 1 determines whether or not the voltage of the battery 12a is the threshold value or less based on information received from the power supply apparatus 12.

In step P22 illustrated in FIG. 4, the controller 1 determines whether or not the ID verification with the portable device 20 is established for the predetermined amount of time. In this example, the ID verification with the portable device 20 implies that the vehicle control apparatus 10 communicates with the portable device 20, and the ID codes respectively assigned to the vehicle control apparatus 10 and the portable device 20 are verified. For example, this verification is executed in a case where keyless entry or passive entry is performed, and engine authentication is performed. The engine authentication implies that an ID code is verified after the engine switch 14 is operated, and when the verification is established, the engine is started.

In step P22 illustrated in FIG. 4, in a case where the UHF receiver 7 does not receive a response signal S3 transmitted from the portable device 20 for a predetermined amount of time, the controller 1 determines that the ID verification with the portable device 20 is not established for the predetermined amount of time. Even if the UHF receiver 7 receives the response signal S3 for the predetermined amount of time, in a case where the ID code of the portable device 20 included in the response signal S3 is not the same as an ID code stored in the internal memory, the controller 1 determines that the ID verification with the portable device 20 is not established for the predetermined amount of time.

In a case where both determinations in steps P21 and P22 illustrated in FIG. 4 are NO, the controller 1 determines that the conditions are not established (step P24 in FIG. 4 and step P3 in FIG. 3A: NO). In this case, the controller 1 confirms whether or not the ID verification with the portable device 20 is established (step P4 in FIG. 3A).

For example, in a case where a user carrying the portable device 20 has approached any one of the welcome areas E1 to E3 of the vehicle 30, the LF receiver 22 of the portable device 20 receives the first response request signal S1 transmitted from any one of the exterior LF transmitters 4 to 6. At this time, the RSSI value of the received first response request signal S1 is detected by the RSSI detector 22b, and is stored in the internal memory of the controller 21. The controller 21 responds with the response signal S3 via the UHF transmitter 23 so as to respond to the first response request signal S1. The response signal S3 includes the ID code assigned to the portable device 20, and the RSSI value of the received first response request signal S1.

When the UHF receiver 7 receives the response signal S3 which is transmitted from the portable device 20 as a response to the first response request signal S1, the controller 1 of the vehicle control apparatus 10 verifies the ID code of the portable device 20 included in the response signal S3 with the ID code stored in the internal memory in advance. When both the ID codes are the same, the controller 1 determines that the ID verification with the portable device 20 is established (step P4 in FIG. 3A: YES). That is, the vehicle control apparatus 10 detects that the user carrying the portable device 20 has approached the vehicle 30.

In this case, the controller 1 allows the welcome light 11 to be turned on (perform a welcome operation) (step P5 in FIG. 3A). Accordingly, the welcome light 11 is turned on to illuminate the ground in the vicinity of the corresponding one of the doors 31 and 32, and welcomes the user to the vehicle 30. The turning on and off of the welcome light 11 may be controlled by the controller 1 or another microcomputer.

Subsequently, the controller 1 compares with the RSSI value included in the received response signal S3 with a predetermined value stored in advance. The predetermined value is set such that it can be confirmed that the portable device 20 positioned a predetermined short distance away from the vehicle control apparatus 10 receives the first response request signal S1 transmitted from the vehicle control apparatus 10.

When the RSSI value included in the response signal S3 is less than the predetermined value (step P6 in FIG. 3A: NO), the controller 1 continues to transmit the first response request signals S1 via the exterior LF transmitters 4 to 6 (step P7 in FIG. 3A). When the ID verification with the portable device 20 is not established for the predetermined amount of time (step P8 in FIG. 3A: NO), the controller 1 stops the transmission of the first response request signals S1 via the exterior LF transmitters 4 to 6 (step P10 in FIG. 3A), and ends the operation.

In contrast, when the ID verification with the portable device 20 is established within the predetermined amount of time (step P8 in FIG. 3A: YES), the controller 1 determines whether or not the RSSI value included in the received response signal S3 is the predetermined value or greater (step P6 in FIG. 3A).

When the RSSI value included in the received response signal S3 is the predetermined value or greater (step P6 in FIG. 3A: YES), the controller 1 allows the door lock apparatus 15 to unlock (welcome operation) any one of the doors 31 to 33 (step P9 in FIG. 3A). Accordingly, any one of the doors 31 to 33 of the vehicle 30 is unlocked by the door lock apparatus 15, and a user carrying the portable device 20 can enter the inside of the vehicle. The controller 1 stops the transmission of the first response request signals S1 via the exterior LF transmitters 4 to 6 (step P10 in FIG. 3A), and ends the operation. After step P10 in FIG. 3A, the controller 1 returns to the "start" stage in FIG. 3A, and executes the steps subsequent to step P1 again.

In contrast, when a user carrying the portable device 20 is present outside of the welcome areas E1 to E3 or in a case where the user is present in any one of the welcome areas E1 to E3 but a lot of noise is present in the vicinity of the vehicle 30, the LF receiver 22 of the portable device 20 may not be able to receive the first response request signals S1 from the exterior LF transmitters 4 to 6 of the vehicle control apparatus 10. Accordingly, the response signal S3 is not transmitted from the UHF transmitter 23 of the portable device 20, and the UHF receiver 7 of the vehicle control apparatus 10 does not receive the response signal S3. As such, in a case where the UHF receiver 7 does not receive the response signal S3 corresponding to the first response request signal S1, the controller 1 determines that the ID verification with the portable device 20 is not established (step P4 in FIG. 3A: NO). The controller 1 continues to transmit the first response request signals S1 via the exterior LF transmitters 4 to 6 (step P1 in FIG. 3A).

Even if the UHF receiver 7 receives the response signal S3 which is transmitted from the portable device 20 as a response to the first response request signal S1, in a case where the ID code of the portable device 20 included in the response signal S3 is not the same as the ID code stored in the internal memory, the controller 1 determines that the ID verification with the portable device 20 is not established (step P4 in FIG. 3A: NO). Also, in this case, the controller 1 continues to transmit the first response request signals S1 via the exterior LF transmitters 4 to 6 (step P1 in FIG. 3A).

In contrast, in a case where a determination in either of step P21 or P22 is YES in the condition confirmation process illustrated in FIG. 4, the controller 1 determines that the conditions are established (step P23 in FIG. 4 and step P3 in FIG. 3A: YES). In this case, the controller 1 intermittently transmits second response request signals S2 at predetermined intervals via the exterior LF transmitters 4 to 6 instead of transmitting the first response request signals S1 (step P11 in FIG. 3A). The second response request signal S2 is a signal different from the first response request signal S1. Particularly, the second response request signal S2 is a signal which is received by the LF receiver 22 of the portable device 20 more easily than the first response request signal S1.

Figure 6:
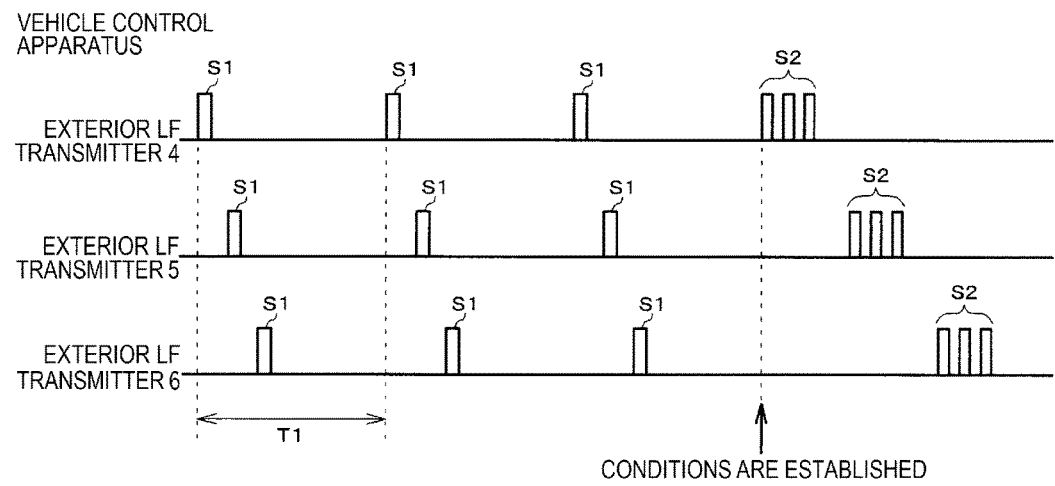
FIG. 6 is a chart illustrating an example of a transmission pattern of the first response request signal and a second response request signal from the exterior LF transmitter in FIG. 1.

FIG. 6 is a chart illustrating an example of a transmission pattern of the first response request signal S1 and the second response request signal S2. After the conditions are established, the exterior LF transmitters 4 to 6 transmit the second response request signals S2 which have a transmission pattern different from that of the first response request signal S1. Specifically, each of the exterior LF transmitters 4 to 6 repeatedly transmits a single first response request signal S1 in the sequence of the exterior LF transmitters 4 to 6. In contrast, each of the exterior LF transmitters 4 to 6 continuously transmits multiple (three) second response request signals S2 in the sequence of the exterior LF transmitters 4 to 6. The first response request signal S1 and the second response request signal S2 have the same data format. The continuous transmission of the second response request signals S2 from each of the exterior LF transmitters 4 to 6 may be repeated at predetermined intervals. Since the second response request signals S2 are continuously transmitted at short intervals in this manner, the second response request signal S2 is more easily received by the LF receiver 22 of the portable device 20, and the noise immunity is improved.

As illustrated in FIGS. 7 to 10, after the conditions are established, each of the exterior LF transmitters 4 to 6 may transmit either of a second response request signal S2' or S2" different from the first response request signal S1.

In the example illustrated in FIG. 7, after the conditions are established, each of the exterior LF transmitters 4 to 6 transmits the second response request signal S2' having a data format different from that of the first response request signal S1. Specifically, as illustrated in FIG. 8, the first response request signal S1 has a data format in which a leading data block includes 8-bit synchronous data, a data block subsequent to the leading data block includes first data indicating vehicle information or the like, and a data block subsequent to the data block includes second data indicating authentication information or the like. In contrast, the second response request signal S2' has a data format in which a leading data block includes 20-bit synchronous data, a data block subsequent to the leading data block includes the first data, and a data block subsequent to the data block includes the second data. The transmission of the second response request signals S2' from each of the exterior LF transmitters 4 to 6 may be repeated at predetermined intervals. Since the synchronous data length of the second response request signal S2' is increased in this manner, the second response request signal S2' is more easily received by the LF receiver 22 of the portable device 20, and the noise immunity is improved.

In the example illustrated in FIG. 9, after the conditions are established, each of the exterior LF transmitters 4 to 6 transmits the second response request signal S2" having LF signal strength different from that of the first response request signal S1. Specifically, as illustrated in FIG. 10, an amplitude A2 of the sinusoidal wave of the second response request signal S2" is set to be greater than an amplitude A1 of the sinusoidal wave of the first response request signal S1 such that the strength of the second response request signal S2" is higher than that of the first response request signal S1. The transmission of the second response request signals S2" from each of the exterior LF transmitters 4 to 6 may be repeated at predetermined intervals. Since the strength of the second response request signal S2" is increased in this manner, the second response request signal S2" is more easily received by the LF receiver 22 of the portable device 20, and the noise immunity is improved.

The controller 1 confirms whether or not the ID verification with the portable device 20 is established while the second response request signals S2 are transmitted by the exterior LF transmitters 4 to 6 (step P12 in FIG. 3A).

In a case where the LF receiver 22 of the portable device 20 does not receive the second response request signals S2 transmitted from the exterior LF transmitters 4 to 6, the response signal S3 is not transmitted from the UHF transmitter 23 of the portable device 20, and the UHF receiver 7 of the vehicle control apparatus 10 does not receive the response signal S3. As such, in a case where the UHF receiver 7 does not receive the response signal S3 corresponding to the second response request signal S2, the controller 1 determines that the ID verification with the portable device 20 is not established (step P12 in FIG. 3A: NO).

Even if the UHF receiver 7 receives the response signal S3 which is transmitted from the portable device 20 corresponding to the second response request signal S2, in a case where the ID code of the portable device 20 included in the response signal S3 is not the same as the ID code stored in the internal memory, the controller 1 determines that the ID verification with the portable device 20 is not established (step P12 in FIG. 3A: NO).

In a case where the ID verification with the portable device 20 is not established (step P12 in FIG. 3A: NO), a user does not approach the vehicle 30, or the ID code of the portable device 20 is verified as being incorrect. The controller 1 transmits the first response request signals S1 in a suppression mode via the exterior LF transmitters 4 to 6 instead of transmitting the second response request signals S2 (step P13 in FIG. 3A).

Figure 14:
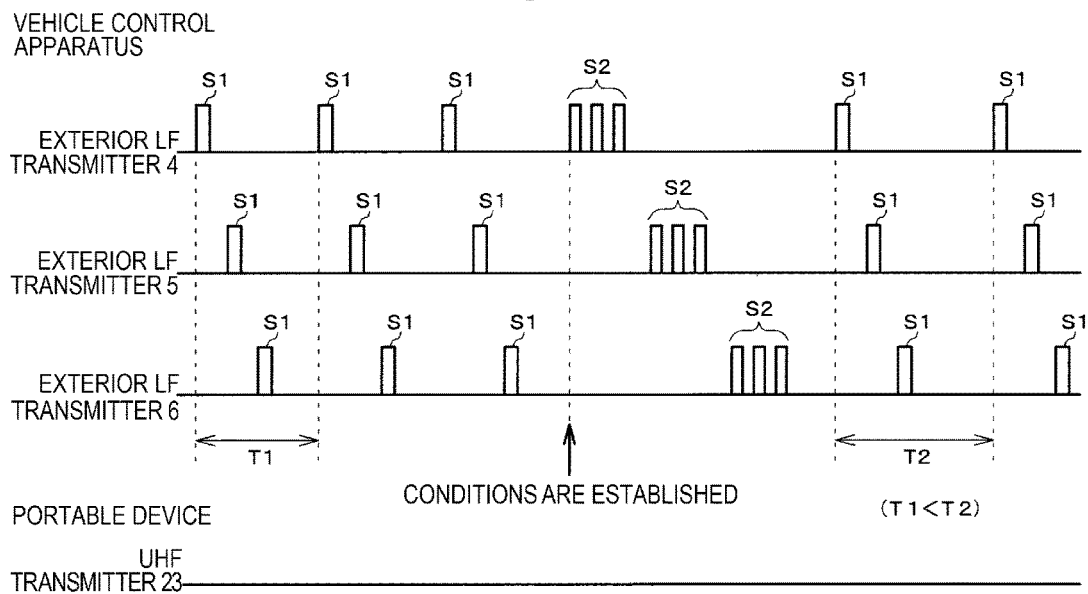
FIG. 14 is a chart illustrating an example of a transmission pattern of the first response request signal and the second response request signal in a case where the vehicle control apparatus in FIG. 1 does not receive a response signal corresponding to the second response request signal.

FIG. 14 is a chart illustrating an example of a transmission pattern of the first response request signal S1 and the second response request signal S2 in a case where the vehicle control apparatus 10 does not receive a response signal corresponding to the second response request signal S2. The transmission pattern of the first response request signal S1 before the transmission of the second response request signal S2 is different from that of the first response request signal S1 after the transmission of the second response request signal S2. Specifically, a transmission period T2 of the first response request signal S1, which is transmitted from each of the exterior LF transmitters 4 to 6 after the transmission of the second response request signal S2 is stopped, is longer than a transmission period T1 of the first response request signal S1 which is transmitted from each of the exterior LF transmitters 4 to 6 before the transmission of the second response request signal S2 (T1<T2). In this manner, after the transmission of the second response request signal S2 is stopped, the transmission of the first response request signals S1 from the exterior LF transmitters 4 to 6 is suppressed.

In addition, the transmission of the first response request signal S1 may be suppressed by the method illustrated in FIG. 15 or 16.

In the example illustrated in FIG. 15, after the transmission of the second response request signals S2 from the exterior LF transmitters 4 to 6 is stopped, the transmission of the first response request signal S1 is stopped. That is, after the transmission of the second response request signals S2 is stopped, the operation of the exterior LF transmitters 4 to 6 is stopped.

In the example illustrated in FIG. 16, the number of exterior LF transmitters 4 to 6, which transmit the first response request signal S1 before the transmission of the second response request signal S2, is different from the number of exterior LF transmitters 4 to 6 which transmit the first response request signal S1 after the transmission of the second response request signal S2. Specifically, before the second response request signal S2 is transmitted, the three exterior LF transmitters 4 to 6 transmit the first response request signals S1. In contrast, after the second response request signal S2 is stopped, the two exterior LF transmitters 4 and 5 transmit the first response request signals S1.

The reason that the exterior LF transmitters 4 and 5 re-start transmission of the first response request signals S1 while stopping the transmission of the first response request signal S1 from the exterior LF transmitter 6 is that the positions of the installation of the respective antennas 4a to 6a of the exterior LF transmitters 4 to 6 have been taken into consideration. That is, as illustrated in FIG. 2, in order to get in the vehicle 30, a user is highly likely to approach the door 31 of the driver's seat where the antenna 4a of the exterior LF transmitter 4, or the door 32 of the front passenger's seat where the antenna 5a of the exterior LF transmitter 5 is provided rather than approaching the back door 33 where the antenna 6a of the exterior LF transmitter 6 is provided. For this reason, the controller 1 stops the operation of the exterior LF transmitter 6 having a lower probability of communication with the portable device 20 than the exterior LF transmitters 4 and 5. The transmission of the first response request signals S1 from the exterior LF transmitters 4 to 6 is suppressed by reducing the number of exterior LF transmitters 4 to 6 transmitting the first response request signal S1 after the transmission of the second response request signal S2 is stopped.

In contrast, when the LF receiver 22 of the portable device 20 receives the second response request signal S2 transmitted from any one of the exterior LF transmitters 4 to 6, the RSSI value of the second response request signal S2 is detected by the RSSI detector 22b, and is stored in the internal memory of the controller 21. The controller 21 transmits the response signal S3 via the UHF transmitter 23 as a response to the second response request signal S2 (FIG. 11 and the like). The response signal S3 also includes the ID code assigned to the portable device 20, and the RSSI value of the received first response request signal S1.

When the UHF receiver 7 of the vehicle control device 10 receives the response signal S3 corresponding to the second response request signal S2, the controller 1 verifies the ID code of the portable device 20 included in the response signal S3 with the ID code stored in the internal memory. When both the ID codes are the same, the controller 1 determines that the ID verification with the portable device 20 is established (step P12 in FIG. 3A: YES).

In this case, the controller 1 allows the welcome light 11 to be turned on (step P14 in FIG. 3B). Subsequently, the controller 1 compares the RSSI valve included in the received response signal S3 with the predetermined value stored in advance. The predetermined value is set such that it can be confirmed that the portable device 20 positioned a predetermined short distance away from the vehicle control apparatus 10 receives the second response request signal S2 transmitted from the vehicle control apparatus 10.

Figure 13:
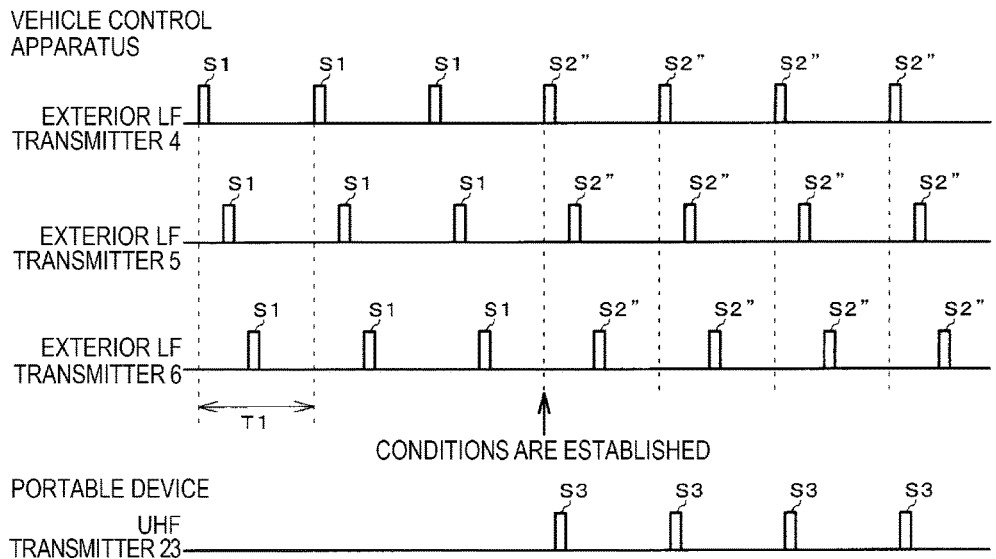
FIG. 13 is a chart illustrating another example of a transmission pattern of the first response request signal, the second response request signal, and a response signal in a case where the vehicle control apparatus in FIG. 1 receives the response signal corresponding to the second response request signal.

When the RSSI value included in the response signal S3 is less than the predetermined value (step P15 in FIG. 3B: NO), the controller 1 continues to transmit the second response request signals S2 via the exterior LF transmitters 4 to 6 (step P16 in FIG. 3B). Accordingly, while a user carrying the portable device 20 stays in any one of the welcome areas E1 to E3, as illustrated in FIG. 11, the trans-reception of the second response request signal S2 and the response signal S3 between the vehicle control apparatus 10 and the portable device 20 is continuously performed. In a case where other second response request signals S2' and S2" are adopted instead of the second response request signal S2, as illustrated in FIG. 12 or 13, the trans-reception of the second response request signal S2' or S2" and the response signal S3 between the vehicle control apparatus 10 and the portable device 20 is continuously performed.

When the ID verification with the portable device 20 is not established within the predetermined amount of time after the continuous transmission of the second response request signal S2 (step 17 in FIG. 3B: NO), the controller 1 stops the transmission of the second response request signals S2 via the exterior LF transmitters 4 to 6 (step P19 in FIG. 3B), and ends the operation.

In contrast, when the ID verification with the portable device 20 is established within the predetermined amount of time (step P17 in FIG. 3B: YES), the controller 1 determines whether or not the RSSI value included in the received response signal S3 is the predetermined value or greater (step P15 in FIG. 3B).

When the RSSI value included in the received response signal S3 is the predetermined value or greater (step P15 in FIG. 3B: YES), the controller 1 allows the door lock apparatus 15 to unlock any one of the doors 31 to 33 (step P18 in FIG. 3B). Thereafter, the controller 1 stops the transmission of the second response request signals S2 via the exterior LF transmitters 4 to 6 (step P19 in FIG. 3B), and ends the operation. After step P19 in FIG. 3B, the controller 1 returns to the "start" stage in FIG. 3A, and executes the steps subsequent to step P1 again.

As described above, in a case where a user carrying the portable device 20 approaches the vehicle 30, and, for example, a lot of noise is present in the vicinity of the vehicle 30, the LF receiver 22 of the portable device 20 may not be able to receive the first response request signals S1 transmitted from the exterior LF transmitters 4 to 6 of the vehicle control apparatus 10.

Meanwhile, when the vehicle control apparatus 10 in the embodiment receives the first response request signals S1 from the exterior LF transmitters 4 to 6, and the conditions set in advance are established, the vehicle control apparatus 10 transmits the second response request signals S2, which are different from the first response request signal S1, via the exterior LF transmitters 4 to 6. For this reason, communication between the vehicle control apparatus 10 and the portable device 20 is enabled such that the LF receiver 22 of the portable device 20 receives the second response request signal S2, and the UHF receiver 7 of the vehicle control apparatus 10 receives the response signal S3 which is transmitted from the UHF transmitter 23 of the portable device 20 as a response. As a result, the controller 1 of the vehicle control apparatus 10 is capable of easily detecting the approach of the user carrying the portable device 20. When the approach of the user is detected, the user can be welcomed to the vehicle 30 in such a way that the welcome light 11 is turned on or any one of the doors 31 to 33 is unlocked.

In a case where the UHF receiver 7 receives the response signal S3 transmitted from the portable device 20 as a response to the second response request signal S2, the ID code is established, and the RSSI value of the second response request signal S2 is less than the predetermined value, the exterior LF transmitters 4 to 6 continue to transmit the second response request signals S2. For this reason, even if a lot of noise is present in the vicinity of the vehicle 30, continuous communication (indicating establishment of the verification of the ID code) between the vehicle control apparatus 10 and the valid portable device 20 can be stably performed until a user approaches and can get in the vehicle 30. Accordingly, reliability of the communication between the vehicle control apparatus 10 and the portable device 20 can be improved.

In the embodiment, in a case where the UHF receiver 7 receives the response signal S3 which is transmitted from the portable device 20 as a response to the response request signal S1 or S2, and the verification of the ID code is established, the operation of the welcome light 11 or the door lock apparatus 15 is allowed to welcome a user to the vehicle 30. For this reason, when a user carrying the valid portable device 20 approaches the vehicle 30, it is possible to welcome the user to the vehicle 30 by turning on the welcome light 11 and unlocking any one of the doors, and thus to improve user's convenience.

In the embodiment, since the second response request signal S2 has a shorter transmission interval, the second response request signal S2' has a longer data length, and the second response request signal S2" has stronger signal strength than the first response request signal S1, the second response request signals S2, S2', and S2" are signals which are received by the LF receiver 22 of the portable device 20 more easily than the first response request signal S1. For this reason, the LF receiver 22 of the portable device 20 easily receives the second response request signals S2, S2', and S2", the UHF receiver 7 of the vehicle control apparatus 10 receives the response signal S3 transmitted from the UHF transmitter 23 of the portable device 20 as a response, and reliability of communication between the vehicle control apparatus 10 and the portable device 20 can be further improved. The controller 1 of the vehicle control apparatus 10 is capable of more accurately detecting the approach of a user carrying the portable device 20.

In the embodiment, conditions for switching a transmission signal of each of the exterior LF transmitters 4 to 6 from the first response request signal S1 to the second response request signal S2 include the condition (step P21 in FIG. 4) that the voltage of the battery 12a is the threshold value or less. For this reason, even when the voltage of the battery 12a is decreased, the approach of a user carrying the portable device 20 can be easily detected while reliability of communication between the vehicle control apparatus 10 and the portable device 20 is further improved. In a case where the second response request signal S2 is transmitted, but the UHF receiver 7 does not receive the response signal S3 from the portable device 20, the transmission of the first response request signal S1 is suppressed. As a result, it is possible to suppress the consumption of electrical power of the battery 12a.

In the embodiment, the conditions for switching a transmission signal of each of the exterior LF transmitters 4 to 6 from the first response request signal S1 to the second response request signal S2 include the condition (step P22 in FIG. 4) that the ID verification with the portable device 20 is not established for the predetermined amount of time. For this reason, it can be detected that normal communication between the vehicle control apparatus 10 and the portable device 20 is not performed for the predetermined amount of time due to an impact of surrounding noise. Since the second response request signal S2 is transmitted, even if a lot of noise is present in the vicinity of the vehicle, the second response request signal S2 and the response signal S3 can be communicated between the vehicle control apparatus 10 and the portable device 20.

In the embodiment, in a case where the conditions are not established, or in a case where the UHF receiver 7 does not receive the response signal S3 which is transmitted from the portable device 20 as a response to the second response request signal S2, the exterior LF transmitters 4 to 6 transmit the first response request signals S1 again. Also, in a case where the UHF receiver 7 receives the response signal S3 which is transmitted from the portable device 20 as a response to the second response request signal S2, but the verification of the ID code included in the response signal S3 is not established, the exterior LF transmitters 4 to 6 transmit the first response request signals S1 again. For this reason, a transmission signal from each of the exterior LF transmitters 4 to 6 is changed back to the first response request signal S1, and the system is capable of returning to a typical detection mode for detecting the portable device 20.

The invention is capable of adopting various embodiments other than the aforementioned embodiment. In the embodiment, in a case where the response signal S3 corresponding to the second response request signal S2 is received from the portable device 20, the ID verification is established, and the RSSI value of the second response request signal S2 is less than the predetermined value, the exterior LF transmitters 4 to 6 continue to transmit the second response request signals S2; however, the invention is not limited to the example described in the embodiment. In addition, in a case where the response signal S3 corresponding to the second response request signal S2 is received from the portable device 20, or in a case where the response signal S3 is received, and the ID verification with the portable device 20 is established, the exterior LF transmitters 4 to 6 may continue to transmit the second response request signals S2.

In the embodiment, the conditions for switching a transmission signal from each of the exterior LF transmitters 4 to 6 from the first response request signal S1 to the second response request signal S2 are described in steps P21 and P22 illustrated in FIG. 4; however, the invention is not limited to the example described in the embodiment. Alternatively, other determination elements may be set as the conditions in advance, for example, the number of times for turning on of the welcome light 11, the number of times for unlocking the doors, or detection of the loitering of a user having no intention of getting in the vehicle may be set as the other determination elements. A combination of multiple determination elements may be set as the conditions. In a case where any one, two or more, or all of the determination elements are YES, it may be determined that the conditions are established.

In the embodiment, when it is detected that a user carrying the portable device 20 approaches the vehicle 30, the welcome light 11 is turned on or any one of the doors 31 to 33 is unlocked to welcome the user; however, the invention is not limited to the example described in the embodiment. Alternatively, either of the turning on of the welcome light and the door unlocking may be performed. Alternatively, a user may be welcomed to the vehicle by other methods, for example, the engine of the vehicle is started, or an air conditioner is driven.

In the embodiment, the three exterior LF transmitters 4 to 6 are provided to transmit the first response request signals or the second response request signals to the outside of the vehicle; however, the invention is not limited to the example in the embodiment. Alternatively, one, two, or four or more vehicle-mounted transmitters may be provided in the vehicle, and each of the vehicle-mounted transmitters may transmit the first response request signal or the second response request signal to the outside of the vehicle.

The aforementioned embodiments are applied to the vehicle control apparatus 10 which is assembled into not only the welcome system 100 but also a keyless entry system or a passive entry system; however, the invention is not limited to the example described in the aforementioned embodiments. The invention can be applied to a vehicle control apparatus which is assembled only into a welcome system, or a vehicle control apparatus which is assembled into a keyless entry system or a passive entry system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle control apparatus comprising:
a vehicle-mounted transmitter which transmits a first response request signal;
a vehicle-mounted receiver which receives a first response signal which is transmitted from a portable device as a response to the first response request signal; and
a controller which controls the vehicle-mounted transmitter and the vehicle-mounted receiver, and which allows a welcome operation of a vehicle-mounted apparatus for welcoming a user carrying the portable device to a vehicle according to a reception state of the response signal received via the vehicle-mounted receiver and an unlock operation for unlocking a door of the vehicle,
wherein when the controller intermittently transmits the first response request signal at predetermined intervals via the vehicle-mounted transmitter, the controller determines whether or not condition set in advance is established,
wherein when the condition is established, the controller transmits a second response request signal, which is different from the first response request signal, via the vehicle-mounted transmitter instead of transmitting the first response request signal,
wherein the controller allows the welcome operation of the vehicle-mounted apparatus according to a reception state of a second response signal received via the vehicle-mounted receiver and transmitted from the portable device as a response to the second response request signal, regardless of the reception state of the first response signal, wherein the second response signal includes a received signal strength of the second response request signal detected by the portable device,
wherein in a case where the received signal strength included in the second response signal is less than a predetermined value, the controller continues to transmit the second response request signal via the vehicle-mounted transmitter,
wherein in a case where the received signal strength included in the second response signal is equal to or greater than the predetermined value, the controller allows an unlock operation for unlocking a door of the vehicle,
wherein in response to one second response signal, the controller determines both whether to allow the welcome operation according to a reception state and whether to allow the unlock operation or continue to transmit another second response signal, and
wherein, when the controller allows the unlock operation, the door of the vehicle is unlocked.

2. The vehicle control apparatus according to claim 1, wherein in a case where the vehicle-mounted receiver receives the second response signal which is transmitted from the portable device as the response to the second response request signal, and verification of an identification (ID) code included in the second response signal is established, the controller continues to transmit the second response request signal via the vehicle-mounted transmitter.

3. The vehicle control apparatus according to claim 2, wherein in a case where the vehicle-mounted receiver receives the second response signal which is transmitted from the portable device as the response to the second response request signal, and the verification of the ID code included in the second response signal is established, the controller allows the operation of the vehicle-mounted apparatus.

4. The vehicle control apparatus according to claim 1, wherein the second response request signal is a signal having a transmission pattern, a data format, or signal strength different from that of the first response request signal.

5. The vehicle control apparatus according to claim 1, wherein the second response request signal is a signal having a shorter transmission interval, a longer data length, or stronger signal strength compared to that of the first response request signal.

6. The vehicle control apparatus according to claim 1, wherein the condition includes a condition that voltage of a battery, which is a power supply of the vehicle, is a threshold value or less.

7. The vehicle control apparatus according to claim 1, wherein the condition includes a condition that communication with the portable device or verification of an ID code with the portable device is not established for a predetermined amount of time.

8. The vehicle control apparatus according to claim 1, wherein in a case where the condition is not established, in a case where the vehicle-mounted receiver does not receive the second response signal which is transmitted from the portable device as the response to the second response request signal, or in a case where the vehicle-mounted receiver receives the second response signal which is transmitted from the portable device as the response to the second response request signal, but verification of an ID code included in the second response signal is not established, the controller transmits the first response request signal again via the vehicle-mounted transmitter.

* * * * *